United States Patent
Cohen et al.

(10) Patent No.: US 12,429,305 B1
(45) Date of Patent: Sep. 30, 2025

(54) CONSTANT INTENSITY LIGHT REGULATING FIREARM SIGHT DEVICE

(71) Applicants: Zevolun Cohen, Casselberry, FL (US); John Russell, Casselberry, FL (US); Robin Rice, Casselberry, FL (US)

(72) Inventors: Zevolun Cohen, Casselberry, FL (US); John Russell, Casselberry, FL (US); Robin Rice, Casselberry, FL (US)

(73) Assignee: Zvetco, LLC, Casselberry, FL (US)

( * ) Notice: Subject to any disclaimer, the term of this patent is extended or adjusted under 35 U.S.C. 154(b) by 0 days.

(21) Appl. No.: 19/269,226

(22) Filed: Jul. 15, 2025

Related U.S. Application Data

(62) Division of application No. 18/791,005, filed on Jul. 31, 2024, now Pat. No. 12,392,579.

(60) Provisional application No. 63/530,781, filed on Aug. 4, 2023.

(51) Int. Cl.
  *F41G 1/30* (2006.01)
  *G02B 23/10* (2006.01)

(52) U.S. Cl.
  CPC .............. *F41G 1/30* (2013.01); *G02B 23/105* (2013.01)

(58) Field of Classification Search
  CPC ....................................................... F41G 1/30
  See application file for complete search history.

(56) References Cited

U.S. PATENT DOCUMENTS

| | | | |
|---|---|---|---|
| 8,186,093 B1 | 5/2012 | Chung | |
| 11,614,225 B1 * | 3/2023 | Sabaldan Elpedes | ..................... F21V 23/0464 362/23.19 |
| 2004/0047586 A1 | 3/2004 | Schick et al. | |
| 2010/0083554 A1 | 4/2010 | Elpedes et al. | |
| 2012/0013258 A1 | 1/2012 | Browe et al. | |
| 2012/0167443 A1 | 7/2012 | Elpedes et al. | |
| 2013/0008072 A1 | 1/2013 | Chung | |
| 2013/0061510 A1 | 3/2013 | Ostergren et al. | |
| 2013/0145666 A1 | 6/2013 | Eriksson et al. | |
| 2013/0199073 A1 | 8/2013 | Jung et al. | |
| 2014/0237884 A1 | 8/2014 | Koesler et al. | |
| 2015/0198415 A1 | 7/2015 | Campean | |

(Continued)

FOREIGN PATENT DOCUMENTS

| | | | |
|---|---|---|---|
| CN | 108592700 A | 9/2018 | |
| CN | 108801052 A * | 11/2018 | ............... F41G 1/30 |

(Continued)

*Primary Examiner* — Gabriel J. Klein
(74) *Attorney, Agent, or Firm* — Jason T. Daniel, Esq.; Daniel Law Offices, P.A.

(57) ABSTRACT

A constant intensity light regulating firearm sight device includes a main body that is mountable onto the firearm and a lens that is positioned along the main body in a direction that is line of sight parallel to a firing axis of the firearm. The device includes a light source, a light sensor and a controller that are positioned along the main body. The light source emits a visible aim point onto the lens, and the light sensor detects and reports ambient light conditions to the controller. The controller includes a memory and processor for storing information and for controlling the operation of the device based on inputs from a user interface and the light sensor. The brightness level of the aim point is adjustable to a user-defined custom brightness setting, and the controller increases or decreases the custom brightness level based on data from the light sensor.

6 Claims, 7 Drawing Sheets

(56) References Cited

U.S. PATENT DOCUMENTS

| | | | |
|---|---|---|---|
| 2018/0306553 A1* | 10/2018 | Denk | F41G 1/35 |
| 2019/0360777 A1 | 11/2019 | Grace et al. | |
| 2020/0103203 A1 | 4/2020 | Seznec-Serpaggi | |
| 2021/0207928 A1 | 7/2021 | Brewer et al. | |
| 2021/0262759 A1* | 8/2021 | Sun | F41G 1/30 |
| 2021/0372737 A1* | 12/2021 | Masarik | H04N 23/11 |
| 2023/0175813 A1* | 6/2023 | Sabaldan Elpedes | F41G 3/08 |
| | | | 42/113 |
| 2023/0176387 A1* | 6/2023 | Sabaldan Elpedes | H05B 47/11 |
| | | | 362/23.19 |
| 2023/0228525 A1* | 7/2023 | Castaneda | F41G 1/345 |
| | | | 89/41.19 |
| 2024/0068778 A1* | 2/2024 | Miller | F41G 1/16 |

FOREIGN PATENT DOCUMENTS

| | | | | |
|---|---|---|---|---|
| DE | 10136278 A1 * | 2/2003 | | G02B 27/34 |
| DE | 10361909 A1 * | 7/2005 | | G02B 27/34 |

* cited by examiner

Brightness Lux Segments

| Min Lux for Segment (MINn) | | Segment # (n) | | Max Lux for Segment (MAXn) |
|---|---|---|---|---|
| 0.01 | < | 0 | ≤ | 0.1 |
| 0.1 | < | 1 | ≤ | 1 |
| 1 | < | 2 | ≤ | 10 |
| 10 | < | 3 | ≤ | 100 |
| 100 | < | 4 | ≤ | 1000 |
| 1000 | < | 5 | ≤ | 10000 |
| 10000 | < | 6 | ≤ | 100000 |

700 — (table)
701 — Min Lux for Segment (MINn)
702 — Segment # (n)
703 — Max Lux for Segment (MAXn)

Brightness Definitions

LED power = Aim point intensity in milliWatts (mW)
$n$ = Lux Segment Number
$m$ = System Brightness Slope Constant
lux = Target Ambient Light Data, in Lux
$MAXn$ = Maximum Lux Value for Lux Segment Number (n)
$b$ = System Brightness Intercept Constant
$\alpha$ = User Brightness Offset Constant
$\beta$ = User Brightness Control Level

FIG. 7

CONSTANT INTENSITY LIGHT REGULATING FIREARM SIGHT DEVICE

CROSS-REFERENCE TO RELATED APPLICATIONS

This application claims the benefit of U.S. Application Ser. No. 63/530,781 filed on Aug. 4, 2023, the contents of which are incorporated herein by reference.

TECHNICAL FIELD

The present invention relates generally to firearm sights, and more particularly to a constant intensity light regulating firearm sight device.

BACKGROUND

The statements in this section merely provide background information related to the present disclosure and may not constitute prior art.

In recent years, red dot sights have become wildly popular firearm accessories. These devices are different from traditional sights as they allow a user to aim and fire their weapon with both eyes open, thus providing the user with enhanced situational awareness to rapidly acquire a target with limited training. Red dot sights are also commonly known as non-magnifying reflector/reflex sights and are mounted onto a firearm to provide the user with an aiming indication in the form of a red dot. Most commercially available red dot sights are designed using a red light-emitting diode (LED) at the focus of collimating optics, which generates a red dot or an illuminated reticle that stays in alignment with the weapon. The dot sight then may be attached to the weapon and used regardless of the eye position of the user (i.e., parallax free).

For best performance, the aim point (e.g., red dot) should be bright and clear. As such, many existing systems allow users to customize the brightness level of their sight to suit their specific preferences. Unfortunately, these user settings are not dynamic, and thus do not change based on environmental conditions such as ambient lighting. As a result, if/when the user moves between dark and bright locations, the aim point will appear to be extremely bright or dim, respectively, thus making use of these sights less than optimal. As such, many users only chose to adjust the aim point from the default setting to a custom setting when they will be operating in a fixed location for long periods of time.

Although some existing sight devices utilize a photo resistor to incrementally change the default brightness level of the aim point a few notches at a time, many users note that the adjustments are not gradual, but instead represent large increases or decreases in brightness that are distracting to the user. As such, it is not uncommon for users to choose to disable this feature.

Accordingly, it would be beneficial to provide a reflex sight device that can generate an aim point having a user-defined custom brightness setting that will be automatically and continually adjusted to maintain a visually constant appearance throughout changing environmental conditions, so as to overcome the drawbacks noted above.

SUMMARY OF THE INVENTION

The present invention is directed to a constant intensity light regulating firearm sight device and a method of operating the same. One embodiment of the present invention can include a main body that is configured to be mounted onto the firearm and a lens that is positioned along the main body in a direction that is line of sight parallel to a firing axis of the firearm. The device can include a light source, a light sensor and a controller that are positioned along the main body.

In one embodiment, the light source can emit a visible aim point onto the lens, and the light sensor can detect and report ambient light conditions to the controller. The controller can include a memory and processor for storing information and for controlling the operation of the device based on inputs from a user interface and the light sensor.

In one embodiment, a user can customize the brightness level of the aim point to a user-defined custom setting, and the light sensor can continuously monitor the ambient light conditions. Upon determining a change in the ambient light conditions, the controller can selectively increase or decrease the custom brightness level of the aim point to provide a consistent brightness and clarity level to the user.

In one embodiment, the determination is made based on a formula stored in the memory and a change to the power level of the light source.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 7 is a chart illustrating an exemplary lookup table for Brightness Lux Segments, in accordance with one embodiment of the invention.

DETAILED DESCRIPTION OF THE INVENTION

Figure 1:
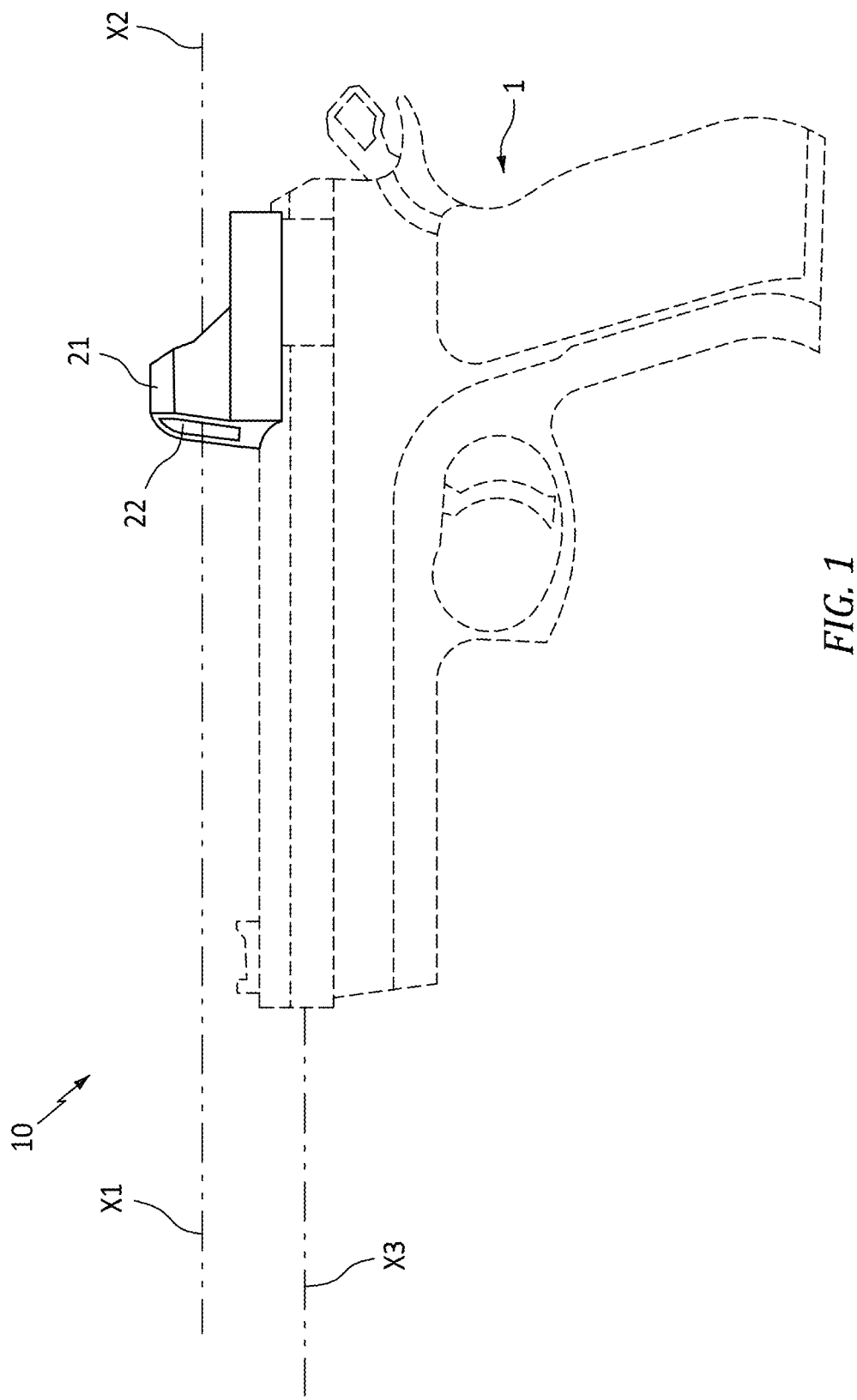
FIG. 1 is a side view of a firearm having an example constant intensity light regulating firearm sight device installed thereon, that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-8 illustrate one embodiment of a constant intensity light regulating firearm sight device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2:
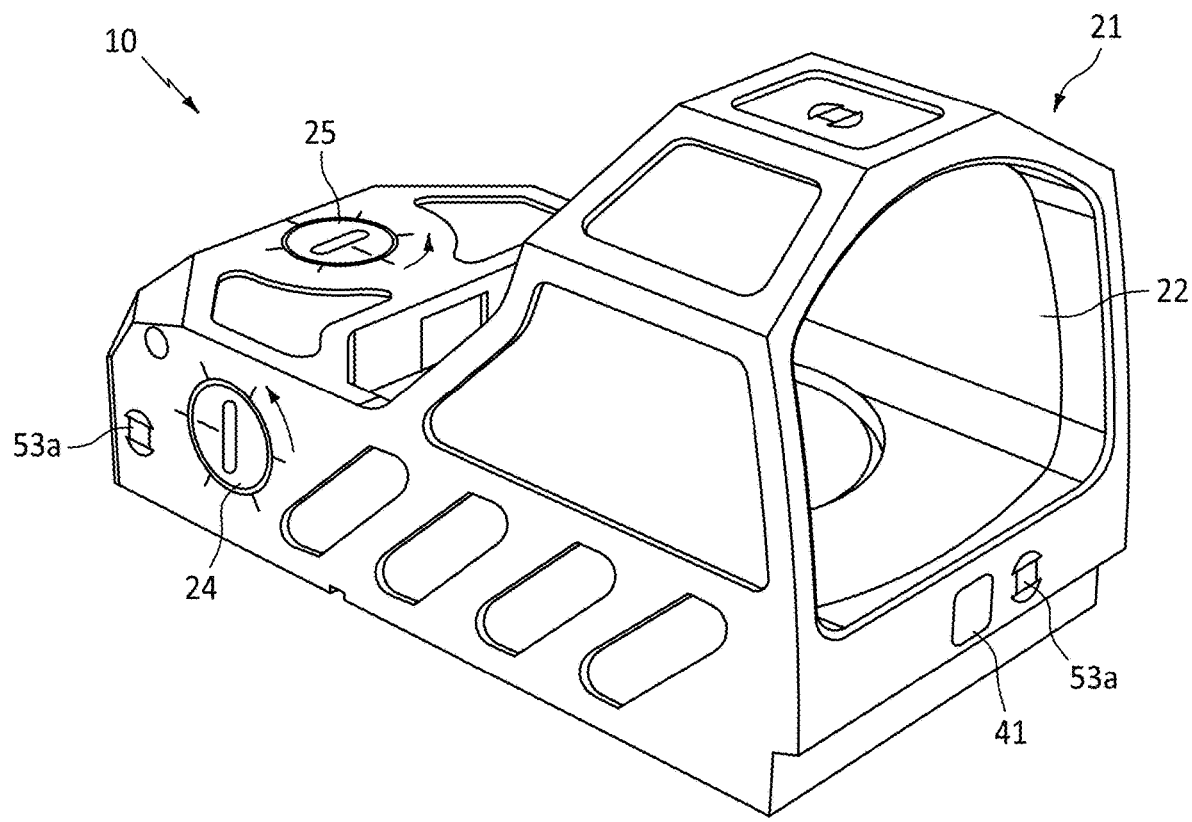
FIG. 2 is a perspective view of the firearm sight device, in accordance with one embodiment of the invention.
Figure 3:
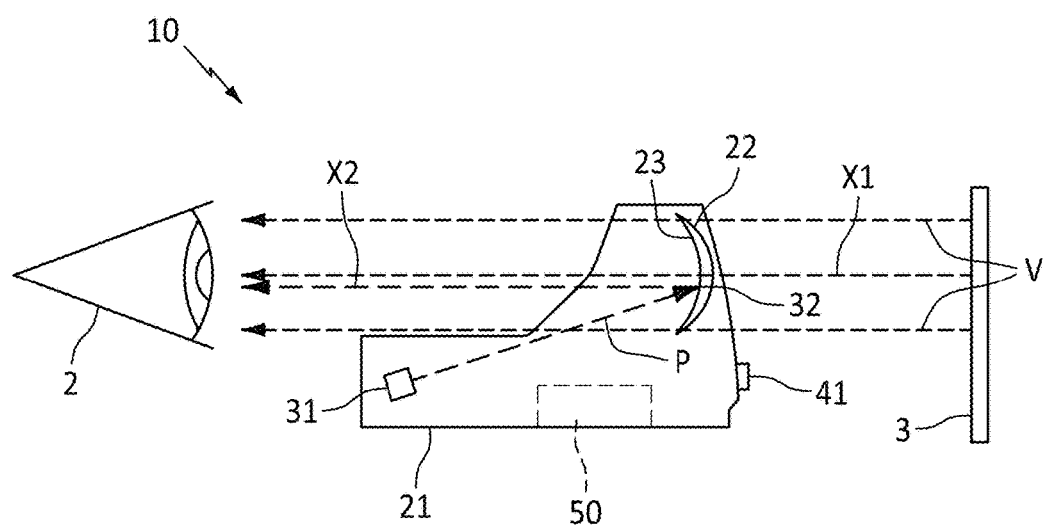
FIG. 3 is a perspective diagram of the firearm sight device, in accordance with one embodiment of the invention.

FIGS. 1-3 illustrate one embodiment of the firearm sight device 10. As shown, the device can include a main body 21 for securely housing the below described components in a shock and weather resistant manner. The device 10 is mountable onto a firearm 1 either directly or via any number of mounting plates. Although illustrated in FIG. 1 with regard to a handgun, this is for illustrative purposes only, as the device may be mounted onto any type of firearm such as various handguns, rifles, or shotguns, for example, directly or via mounting plates in the expected manner.

In either instance, when mounted onto the firearm 1, the device housing 21 will position the optical lens 22 so as to define a target line of sight X1 extending from the distal end of the lens in a manner that is serial to the below described viewing axis X2, and that is parallel to and offset from the firing axis X3 of the firearm 1.

As described herein, the main body 21 can be constructed from any number of materials that are, for example, relatively strong and stiff for their weight. Several nonlimiting examples include, but are not limited to various metals, metal alloys, plastic/polymers, and/or various composite materials.

The optical lens 22 can be positioned along the main body 21 such that a user's eye 2 is able to see through the lens when viewing a target 3. In the preferred embodiment, the optical lens can include a non-magnified glass lens having an optical coating 23. The coating can ideally comprise an optical film that reflects selective wavelengths such as those between about 475 nm to 750 nm, for example. In this regard, the optical coating can function to reflect red or green light provided by the light source as an aim point that is visible to the user when looking through the lens. Of course, any number of other materials, coatings and/or wavelengths are also contemplated.

In one embodiment, a light source 31 such as a red LED, for example, can be positioned within the housing. In the preferred embodiment, the LED can be biased at a fixed power level so the duty cycle of a PWM control signal from the below described system controller 50 can determine the power output of the same; however other embodiments are contemplated having different qualities.

The light source 21 can function to selectively emit a reticle image/aim point 32 onto the optical lens 22 via a first path P. The emitted aim point, such as a red dot, for example, can be reflected by the optical coating 23 to be visible to a user's eye 2 along the viewing axis X2 such that the user can see a complete field of view V of their target 3 through the lens 22 and a reflection of the projected aim point 32 simultaneously when looking through the lens. As will be described below, the characteristics of the emitted aim point can be customized by the user and can be constantly adjusted by the controller to ensure consistent brightness and clarity regardless of the changing environmental (e.g., lighting) conditions.

Although described above with regard to a single red LED, this is for illustrative purposes only, as the light source 31 can include, comprise or consist of any type or number of identical or different light producing devices that are suitable for individually or collectively emitting any type of aim point onto the optical lens in any color or range of colors.

In one embodiment, lateral and vertical adjustments to the light source and/or the aim point can be accomplished via manual dials 24 and 25, respectively, so as to adjust the location at which the aim point is displayed on the lens. Such a feature allows a user to ensure the aim point coincides with the point of impact of a bullet fired by the firearm. Each of the dials can be connected to mechanical sliders within the housing 21 which operate to adjust the orientation of the light source in the desired direction.

In one embodiment, an ambient light sensor 41, can be positioned along the main body 21. The light sensor can be connected to the system controller 50 and can function to detect and report ambient light settings (e.g., target light settings) as seen by the human eye located along the target line of sight X1.

As described herein, the light sensor 41 can include, comprise or consist of an ambient light sensor that is specifically designed to measure the intensity of light as visible by the human eye. The precision spectral response and strong IR rejection of the device enables the ambient light sensor 41 to accurately meter the intensity of light as seen by the human eye regardless of the source or intensity of the light. More specifically, the ambient light sensor 41 can determine, as units of lux, the total "amount" of visible light present, and the illuminance as a measure of the intensity of illumination on a surface. These measurements can range from near-total darkness (0.01 lux) to full sunlight (83 k lux). The data obtained by the light sensor can be relayed to the controller 50 in real time.

Figure 4:
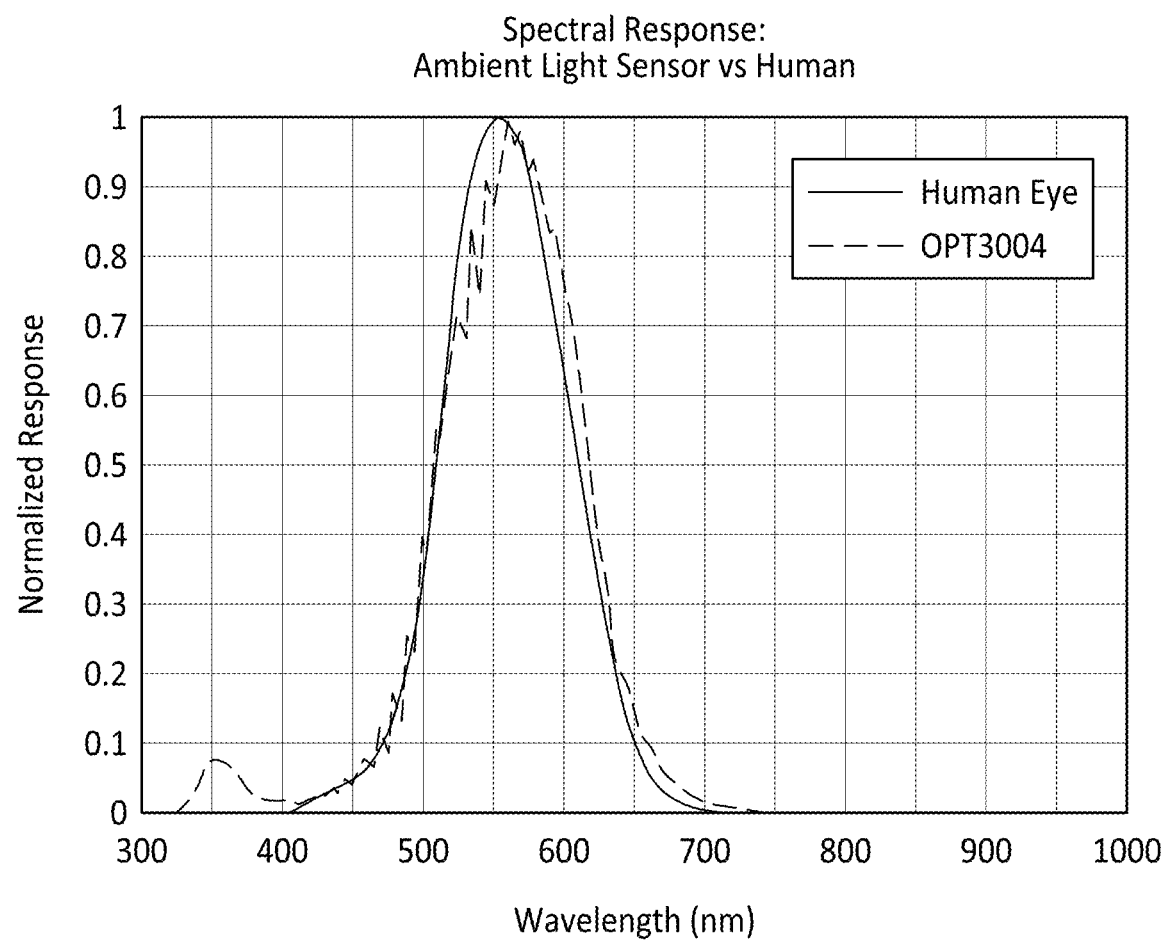
FIG. 4 is a chart illustrating the exemplary spectral relationship between the ambient light sensor of the firearm sight device and a human eye that is useful for understanding the inventive concepts disclosed herein.

FIG. 4 is chart illustrating the spectral relationship between the ambient light sensor 41 of the device 10 and a human eye. The ambient light sensor 41 is a sensor that measures the intensity of visible light. The spectral response of the sensor tightly matches the photopic response of the human eye and includes significant infrared rejection over a wide angle of incidence.

In the preferred embodiment, the light sensor can comprise the model OPT3004 Ambient light Sensor that is commercially available from Texas Instruments®. Unlike photodiodes, photoresistors, or other ambient light sensors, the ambient light sensor 41 of the device 10 is specifically optimized for light-based experiences of humans. Of course, the inventive concepts are not limited to any particular brand of sensor, as other sensors (including multiple sensors) capable of performing the functionality described herein are also contemplated.

Figure 5:
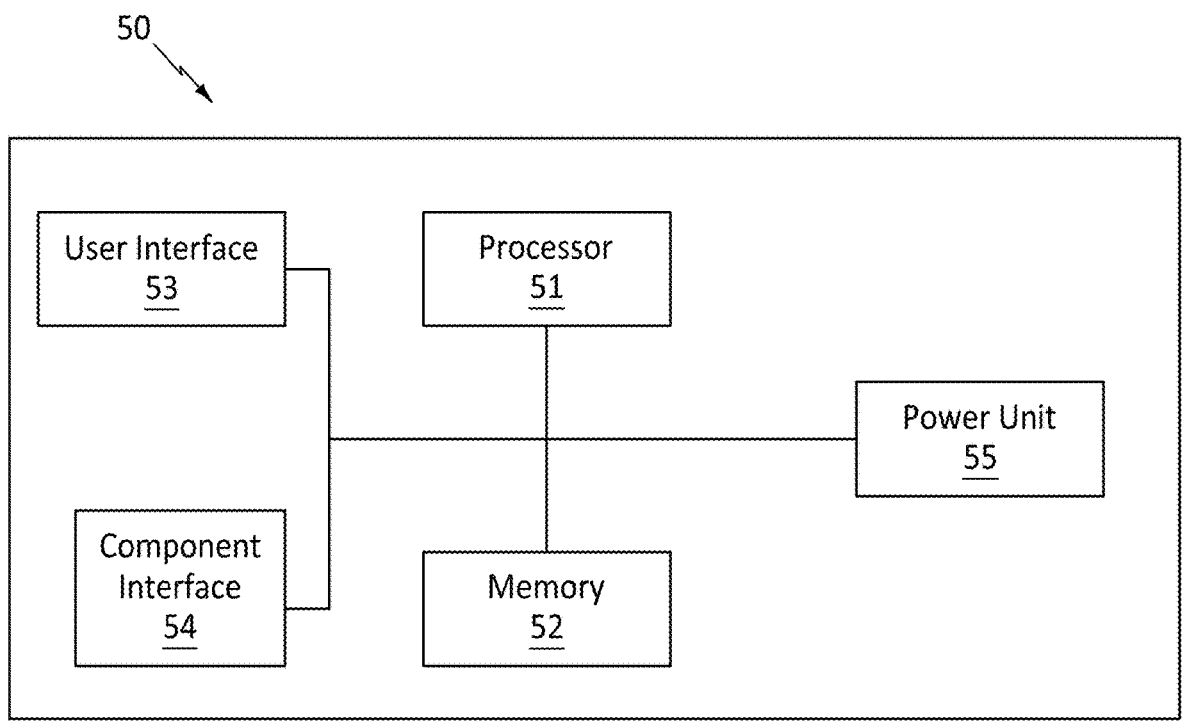
FIG. 5 is a simplified block diagram of the system controller of the firearm sight device, in accordance with one embodiment of the invention.

FIG. 5 is a simplistic block diagram illustrating one embodiment of the system controller 50. In one embodiment, controller 50 can include a processing unit 51 that is conventionally connected to an internal memory 52, a user interface 53, a component interface unit 54, and a power unit 55.

Although illustrated as separate elements, those of skill in the art will recognize that one or more system components 51-55 may include, comprise, or consist of one or more printed circuit boards (PCB) containing any number of integrated circuit or circuits for completing the activities described herein. Of course, any number of other analog and/or digital components capable of performing the described functionality can be provided in place of, or in conjunction with the described elements.

The processing unit 51 can include one or more central processing units (CPU) or any other type of device, or multiple devices, capable of manipulating or processing information such as program code stored in the memory 52 in order to allow the device to perform the functionality described herein.

Memory 52 can act to store operating instructions, sensor data, formulas and other types of information. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device, for example.

The user interface 53 can act to accept user inputs and provide instructions to the processor throughout the operation of the device. In one preferred embodiment, the user interface can include an accelerometer that is positioned within the housing. The accelerometer can function to detect taps along the main body corresponding to operational instructions from a user. In order to differentiate accidental taps from intentional taps, the processor can advantageously coordinate detected accelerometer taps at various tap locations 53a along the main body 21 with simultaneous changes in light detected by the light source 31.

Of course, other embodiments are contemplated wherein different components such as physical buttons or capacitive touch sensors, for example, are provided to receive operating instructions from a user.

The component interface unit 54 can function to provide a communicative link between the processing unit 51 and each of the device components such as the light source 31, the adaptive light sensor 41 and/or the user interface 53 via the tap location(s) 53a, for example. In various embodiments the component interface unit can include or can be connected to any number of different components such as one or more PIC microcontrollers, communication bus, connection cables, or any number of other elements capable of communicatively linking the various device components.

The power source 55 can include one or more batteries capable of providing the necessary power requirements to each of the device components. In the preferred embodiment, the main body can include an accessible cavity wherein the battery or batteries can be installed and replaced as needed. Of course, other embodiments are contemplated wherein the battery is permanently installed within the unit and is rechargeable via a charging port or a wireless charging mechanism, for example.

In operation, a user can activate the device 10, to visually see the default aim point image 32 displayed on the lens. Next, the user can operate the user interface 53 to increase or decrease the brightness of the aim point image and can temporarily or permanently save the customized user settings to the controller 50.

As noted above, the device 10 can function to continuously measure light conditions and adapt the brightness of the aim point to provide a consistent brightness and clarity level to the user, even as external lighting conditions change such as would happen when moving from a dark room to a bright area, for example. Moreover, the device can perform this functionality based on either the system's default brightness level or the user's customized brightness level so that the user will see their customized aim point settings at all times.

This functionality can be performed whereby the controller 50 monitors the output of the ambient light sensor 41 to determine the brightness of the target view area V and target line of sight X1 (referred to concurrently as the target environment). Based upon the determined brightness and the specified user brightness settings, the controller 50 can immediately adjust the output of the light source 31, thus adjusting the appearance of the aim point image 32.

Figure 6:
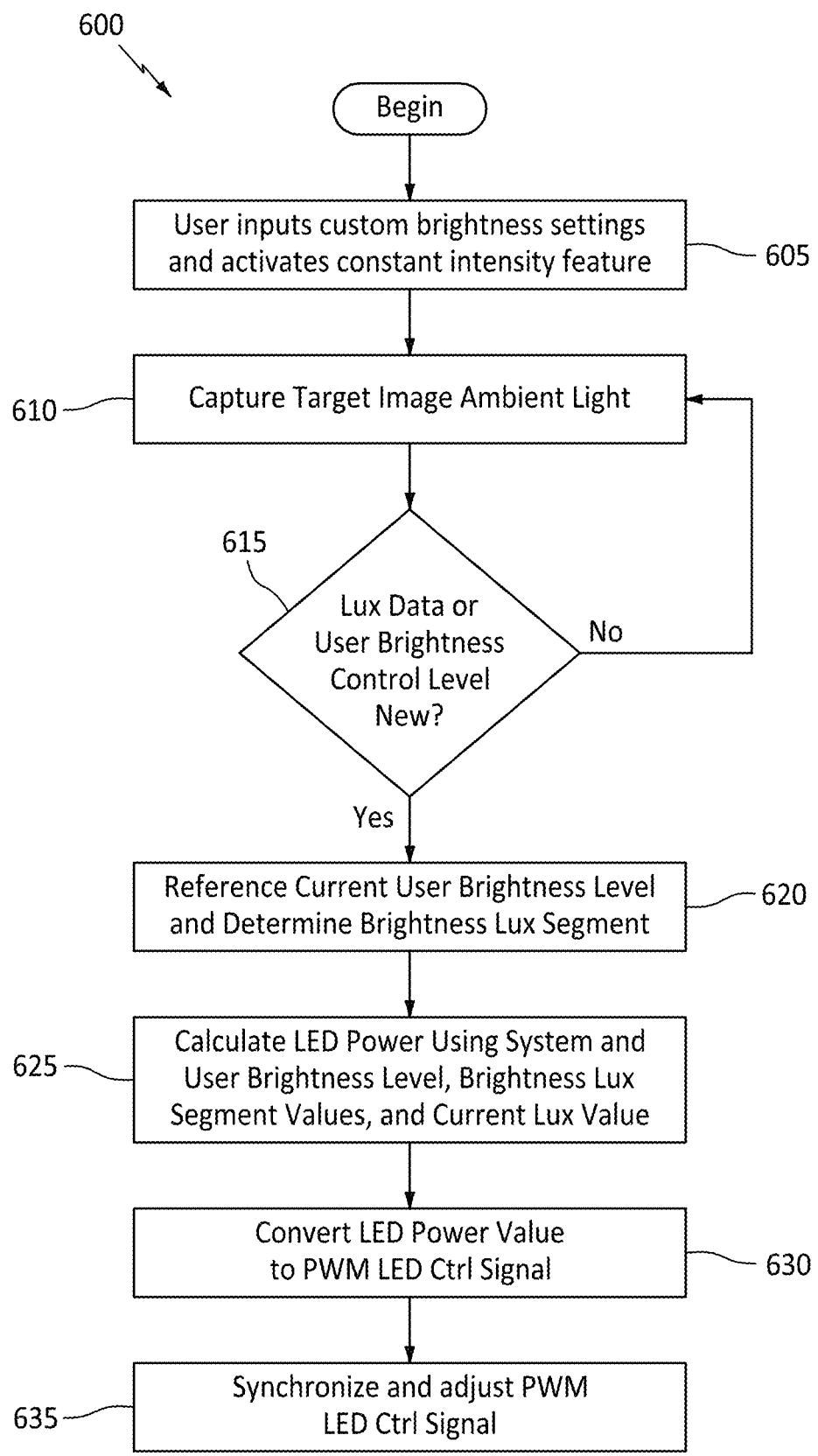
FIG. 6 shows an exemplary flow diagram illustrating a method for providing constant intensity light regulation, utilizing the firearm sight device, according to one embodiment.

FIG. 6 illustrates one embodiment of a method 600 for providing constant intensity light regulation, utilizing the firearm device 10. Although described below with respect to particular steps and a particular order of steps, this is for illustrative purposes only, as the methodology described herein can be performed in a different order than shown, and/or additional steps may be performed instead of or concurrently with one or more identified method steps.

The method can begin at step 605 where a user adjusts the brightness level of the aim point to their custom setting and activates the adaptive constant intensity feature of the device 10 using the user interface.

Upon receiving the activation instruction from the user, the method will proceed to step 610 where the controller will activate the ambient light sensor 41 to acquire and report light data such as lux data from the target environment. Upon receiving the data, the method will proceed to step 615 where the controller 50 will compare the received data with the previously stored light data to determine if there has been a change. Additionally, the controller will compare the current user brightness settings with the previously stored user brightness settings to determine if these have changed. If neither of the compared values have changed, the system will return to step 610. If either of the values have changed, the system will proceed to step 620.

At step 620, the controller 50 can reference the current user brightness control levels as inputted at step 605 and can utilize a pre-determined lookup table stored within the memory of the controller to determine the brightness lux segments for use in the upcoming method steps. One non-limiting example of a lookup table for Brightness Lux Segments 700 is provided at FIG. 7 and includes a Minimum Lux for Segment value (MINn) 701, a Segment Number (n) 702, and a Maximum Lux for Segment value (MAXn) 703.

Next, the method can proceed to step 625 where the controller 50 can determine changes to the light source 31 necessary to maintain the brightness level of the aim point 32 based on the currently detected ambient light conditions and the user settings.

When the light source 31 comprises an LED light, the changes determined by step 625 can be to the power output of the light, and can be determined based on a formula as follows:

$$\text{LED Power} = (3.16)n*[(m)*((\text{lux})/(\text{MAX}n))+(b)+/-((\alpha)*((\beta))]$$

In the formula, n represents the Lux Segment Number from the chart 700; m represents the System Brightness slope Constant; lux represents the Target Ambient Light Data, in Lux; MAXn represents the Maximum Lux Value for the Lux segment Number (n); b represents the System Brightness Intercept Constant; $\alpha$ represents the User brightness Offset Constant; and $\beta$ represents the User Brightness Control level.

In step 630, the controller 50 can change the output of the light source 31, thus changing the intensity of the aim point 32 based on the determination of step 625. In the current example, the controller 50 can convert the determined LED Power value into a PWM LED control signal.

Finally, in step 635, the controller 50 can delay update until time synchronized with rising edge of PWM LED control signal. Then the Controller 50 can adjust the LED control signal coupled to the LED light source 31.

Utilization of the above noted formula in conjunction with an ambient light sensor that is specifically designed to measure the intensity of light as visible by the human eye is an important feature, as this allows the device to automatically make hundreds of incremental adjustments to the brightness level of the aim point as the ambient lighting changes which are not individually noticeable to the human eye and thus alleviate the distractions common with existing sight devices.

Figure 8:
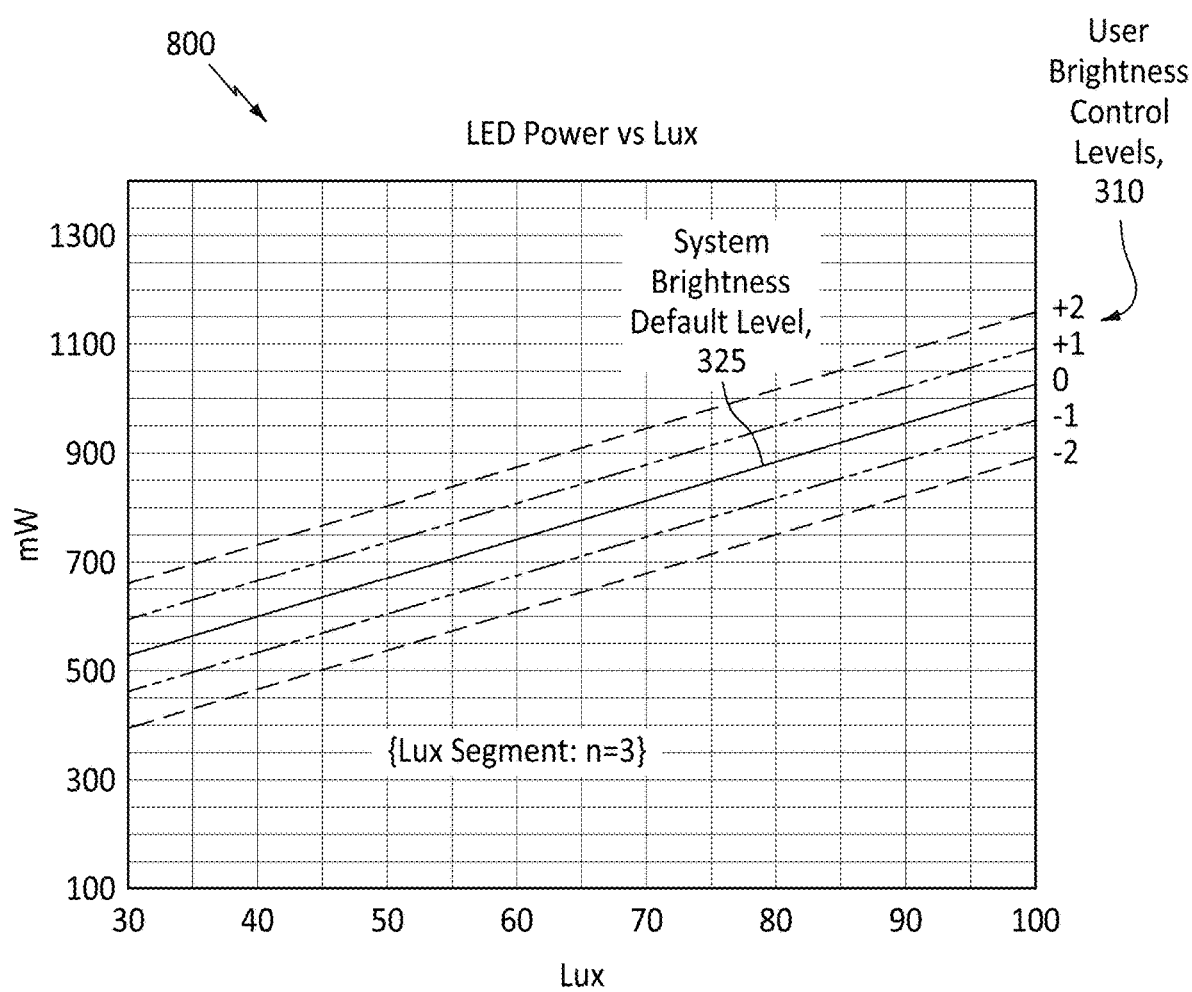
FIG. 8 is a graphical representation of LED Power as related to captured Lux information, in accordance with one embodiment of the invention.

FIG. 8 illustrates a graph 800 which demonstrates the methodology outlined above and provides a comparison of LED power changes versus Lux. As shown, once the user sets their custom settings, the adaptive methodology will raise or lower the aim point brightness in accordance with the changes to the default settings continuously. Such a feature eliminates the noticeable stepped increases or decreases of existing systems and provides a smooth transition of adaptive brightness that conforms with the user's custom settings at all times in any changing environmental conditions.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
providing a sight device for a firearm having a main body, a lens that is positioned along the main body, a light source that is positioned along the main body, a light sensor that is positioned along the main body, a controller that is positioned within the main body, and a controller memory that stores a brightness adjustment formula;
emitting, via the light source, an aim point onto a first surface of the lens;
receiving, via a user interface, an instruction to change the emitted aim point from a default brightness level to a custom brightness level;
receiving, via the light sensor, an ambient light lux value; and
continuously changing the custom brightness level of the aim point based on an output of the brightness adjustment formula utilizing the received ambient light lux value to provide a consistent brightness to a human eye viewing the aim point,
wherein the controller changes an output power of a light emitting diode to change the brightness level of the aim point based on the brightness adjustment formula, wherein the brightness adjustment formula comprises:

$$\text{LED Power} = (3.16)n * [(m) * ((\text{lux})/(\text{MAX}n)) + (b) +/- ((\alpha) * (\beta))]$$

wherein n represents a Lux Segment Number; m represents a System Brightness slope Constant; lux represents Target Ambient Light Data, in Lux; MAXn represents a Maximum Lux Value for the Lux segment Number n; b represents a System Brightness Intercept Constant; $\alpha$ represents a User brightness Offset Constant; and $\beta$ represents a User Brightness Control level.

2. The method of claim 1, wherein the light sensor is configured to continuously capture ambient light lux values, and further comprising:
   storing the captured ambient light values within the memory.

3. The method of claim 2, further comprising:
   comparing a new captured ambient light value with a stored ambient light value.

4. The method of claim 3, wherein said changing the custom brightness level of the aim point is performed in response to a determination that the new captured ambient light value is different that the stored ambient light value.

5. The method of claim 4, wherein the custom brightness level of the aim point is increased based on a determination that the new captured ambient light value is greater than the stored ambient light value.

6. The method of claim 4, wherein the custom brightness level of the aim point is decreased based on a determination that the new captured ambient light value is less than the stored ambient light value.

\* \* \* \* \*